United States Patent
Yamazaki

(10) Patent No.: US 9,334,413 B2
(45) Date of Patent: May 10, 2016

(54) INK SET AND RECORDING METHOD USING THE SAME

(71) Applicant: Seiko Epson Corporation, Tokyo (JP)

(72) Inventor: Soichi Yamazaki, Shiojiri (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 14/636,462

(22) Filed: Mar. 3, 2015

(65) Prior Publication Data

US 2015/0166808 A1    Jun. 18, 2015

Related U.S. Application Data

(63) Continuation of application No. 13/601,136, filed on Aug. 31, 2012, now Pat. No. 8,999,051.

(30) Foreign Application Priority Data

Sep. 2, 2011    (JP) ................. 2011-191461

(51) Int. Cl.
  *C09D 11/02*   (2014.01)
  *C09D 11/40*   (2014.01)
  *C09D 11/322*  (2014.01)
  *C09D 11/38*   (2014.01)

(52) U.S. Cl.
  CPC .............. *C09D 11/40* (2013.01); *C09D 11/322* (2013.01); *C09D 11/38* (2013.01)

(58) Field of Classification Search
  CPC ..................................................... C09D 11/40
  See application file for complete search history.

(56) References Cited

U.S. PATENT DOCUMENTS

| | | |
|---|---|---|
| 5,609,671 A | 3/1997 | Nagasawa |
| 5,637,140 A | 6/1997 | Fujioka |
| 5,837,045 A | 11/1998 | Johnson et al. |
| 6,280,513 B1 | 8/2001 | Osumi et al. |
| 2002/0077385 A1 | 6/2002 | Miyabayashi |
| 2003/0029355 A1 | 2/2003 | Miyabayashi |
| 2003/0079643 A1 | 5/2003 | Tomioka et al. |
| 2004/0173120 A1 | 9/2004 | Tsuru et al. |
| 2004/0187732 A1 | 9/2004 | Roman et al. |
| 2005/0007432 A1 | 1/2005 | Kanaya et al. |
| 2005/0054751 A1 | 3/2005 | Namba et al. |
| 2007/0119339 A1 | 5/2007 | Kovacs et al. |
| 2009/0196994 A1 | 8/2009 | Endo |
| 2009/0281219 A1 | 11/2009 | Watanabe et al. |
| 2010/0047455 A1 | 2/2010 | Hoogmartens |
| 2010/0110153 A1 | 5/2010 | Morimoto |

FOREIGN PATENT DOCUMENTS

| | | |
|---|---|---|
| JP | 08-003498 | 1/1996 |
| JP | 08-157761 | 6/1996 |
| JP | 09-003374 | 1/1997 |
| JP | 09-151342 | 6/1997 |
| JP | 2000-513396 A | 10/2000 |
| JP | 2003-147235 A | 5/2003 |
| JP | 2011-057991 A | 3/2011 |
| JP | 05-186704 B2 | 4/2013 |

*Primary Examiner* — Veronica F Faison

(74) *Attorney, Agent, or Firm* — Harness, Dickey & Pierce, P.L.C.

(57) ABSTRACT

An ink set includes a first ink containing a fatty acid and a self-dispersing pigment, and at least either a second ink containing a resin-dispersed pigment and substantially no fatty acid or a third ink containing a self-dispersing pigment and substantially no fatty acid.

14 Claims, No Drawings

INK SET AND RECORDING METHOD USING THE SAME

CROSS-REFERENCE TO RELATED APPLICATIONS

This is a continuation patent application of U.S. application Ser. No. 13/601,136 filed Aug. 31, 2012 which claims priority to Japanese Application No. 2011-191461 filed on Sep. 2, 2011, all of which are expressly incorporated by reference herein.

BACKGROUND

1. Technical Field

The present invention relates to an ink set and a recording method using the ink set.

2. Related Art

An ink jet recording method is a technique for printing performed by ejecting small droplets of an ink and thus depositing the droplets on a recording medium, such as a paper sheet. The ink used in the ink jet recording method is typically prepared by dissolving a water-soluble dye in water or a mixture of water and a water-soluble organic solvent.

JP-A-8-157761 discloses an aqueous ink to substantially solve the problem of color bleeding in recording on plain paper. The ink contains a black dye, diethylene glycol, isopropyl alcohol, octane, a surfactant, nitrocellulose, and water (see Paragraph 0009 and Example 1 of Paragraph 0048 in the cited document).

However, images formed with such an ink containing a water-soluble dye are inferior in water fastness and light fastness. In addition, when used for recording on a low-absorbent recording medium, such an ink disadvantageously causes abnormal bleeding. Furthermore, the above-cited JP-A-8-157761 merely describes a technique for recording on plain paper with a single ink, but not with an ink set, that is, a combination of a plurality of inks. An ink set is desired which does not cause bleeding in recording on a low-absorbent recording medium.

SUMMARY

Accordingly, an advantage of some aspects of the invention is that it provides an ink set that exhibits an anti-bleeding effect when used for recording on a low-absorbent recording medium.

Another aspect is to provide a recording method using the ink set.

The present inventors have conducted intensive research to solve the above issue, and found that by selecting inks for an ink set so that each of the inks has a specific relationship between the pigment and the presence or absence of a fatty acid, an ink set exhibiting an anti-bleeding effect can be achieved.

According to an aspect of the invention, an ink set is provided. The ink set includes a first ink containing a fatty acid and a self-dispersing pigment, and at least either a second ink containing a resin-dispersed pigment and substantially no fatty acid or a third ink containing a self-dispersing pigment and substantially no fatty acid.

The ink set may include the first ink, the second ink and the third ink.

The first ink may be a black ink.

The second ink may be a yellow ink.

The third ink may be at least either a cyan ink or a magenta ink.

The ink set may include the first ink including a black ink, the second ink including a yellow ink, and the third ink including a cyan ink and a magenta ink.

The first ink and the third ink may contain resin particles.

According to another aspect of the invention, a recording method is provided which includes recording with the ink set.

DESCRIPTION OF EXEMPLARY EMBODIMENTS

Embodiments of the invention will now be described. The following embodiments are illustrated by way of example and are not intended to limit the invention. In the invention, various modifications may be made without departing from the scope and spirit of the invention.

The term "bleeding" used herein means that ink or color spreads from one area to another, and "anti-bleeding effect" means that different colors are unlikely to bleed into each other at their boundary.

In the description hereinafter, "(meth)acrylate" refers to an acrylate and a corresponding methacrylate, and a (meth)acrylic compound refers to an acrylic compound or a corresponding methacrylic compound.

The term "low-absorbent recording medium" refers to a recording medium having no aqueous ink-receiving layer or a recording medium insufficient to receive aqueous ink. More specifically, a low-absorbent recording medium is such that the recording surface of the medium can absorb water at 10 mL/m$^2$ or less for a period of 30 ms$^{1/2}$ from the beginning of contact with water when measured by Bristow's method. Bristow's method is broadly used as a method for measuring liquid absorption for a short time, and Japan Technical Association of the Pulp and Paper Industry (JAPAN TAPPI) has officially adopted this method. Details of this method are specified in Standard No. 51 (Paper and Paperboard—Liquid absorption Test Method—Bristow's Method (in Japanese)) of JAPAN TAPPI Paper and Pulp Test Methods edited in 2000 (in Japanese).

Ink Set

An ink set according to an embodiment of the invention will now be described. The ink set includes a first ink and at least either a second ink or a third ink. Each of the inks has a predetermined composition.

The first ink contains at least a fatty acid and a self-dispersing pigment. Preferably, the first ink is a black ink, which can create text documents with high color developability.

The self-dispersing pigment can be present in a high ratio to the total mass (100% by mass) of the ink and accordingly helps produce a recorded article with a high color developability. In addition, if the first ink contains oleic acid, it can be stably discharged even if the pigment content is as high as 6% by mass or more. Accordingly, the pigment content in the first ink is preferably the highest of all the inks of the ink set.

The second ink contains at least a resin-dispersed pigment and substantially no fatty acid. This composition is effective to yellow inks, which are liable to make bleeding conspicuous at the boundary with a black ink. Therefore, the second ink is preferably a yellow ink.

How conspicuous a bleeding between different color inks is depends on the difference in lightness among colors. For example, if an ink set including a black ink, a cyan ink, a magenta ink and a yellow ink is used, a bleeding between the black ink, which has a low lightness, and the yellow ink, which has a high lightness, will be conspicuous. Accordingly, the second ink preferably has the highest lightness of all the inks of the ink set, and, for example, may be a light ink containing 1% to 3% by mass of a pigment relative to the total mass (100% by mass) of the ink. The light ink may be, for example, a light cyan ink or a light magenta ink.

The third ink contains at least a self-dispersing pigment and substantially no fatty acid. This composition exhibits the second highest anti-bleeding effect (can reduce bleeding) at the boundary with a black ink, following to the anti-bleeding effect between a black ink and a yellow ink. Therefore, the third ink is preferably at least either a cyan ink or a magenta ink, and more preferably includes a cyan ink and a magenta ink.

Preferred colors of the first to third inks have been described above. In the following description, five preferred combinations (1) to (5) for the ink set will be described.

Combination (1)

An ink set of Combination (1) includes first inks including a black ink, a cyan ink and a magenta ink, and a second ink including a yellow ink. This ink set allows on a plain paper both printing with high optical density (hereinafter referred to as high OD printing) and printing with high, uniform glossiness (hereinafter referred to as high-gloss printing). In business use, in which primary colors are much used, bleeding is particularly conspicuous between yellow and other colors, especially on less permeable paper. However, the first ink containing a fatty acid forms a fatty acid layer on paper. Even if the first ink comes into contact with other inks containing substantially no fatty acid, the fatty acid layer prevents the first ink from mixing with other inks. Thus, combination (1) can be an ink set that can exhibit an anti-bleeding effect.

Combination (2)

An ink set of Combination (2) includes a first ink including a black ink, and second inks including a cyan ink, a magenta ink and a yellow ink. This ink set allows both high OD printing and high gloss printing, and can exhibit a higher anti-bleeding effect. In the use for photographs, in which mixed colors are much used, bleeding becomes conspicuous at boundaries of mixed colors among cyan, magenta and yellow. However, the cyan, magenta and yellow inks have different compositions based on the combinations according to whether or not a fatty acid is present and what pigment (which pigment, a self-dispersing pigment or a resin-dispersed pigment) is used. Consequently, these different color inks are difficult to mix.

Combination (3)

An ink set of Combination (3) includes a first ink including a black ink, and third inks including a cyan ink, a magenta ink and a yellow ink. This ink set allows both high OD printing and high gloss printing. When black characters are emphasized, in general, bleeding becomes conspicuous particularly between black and other colors. By using an ink set including a black ink containing a fatty acid and color inks containing substantially no fatty acid, still higher anti-bleeding effect can be exhibited even though a text, or characters and letters, is printed.

Combination (4)

An ink set of Combination (4) includes first inks including a black ink and a cyan ink, a second ink including a yellow ink, and a third ink including a magenta ink This combination has the same advantages as Combination (3).

Combination (5)

An ink set of Combination (5) includes a first ink including a black ink, a second ink including a yellow ink, and third inks including a cyan ink and a magenta ink. This combination has the same advantages as Combination (3).

Possible constituents (including additives) of the inks will now be described in detail. The inks mentioned hereinafter refer to all the inks constituting the ink set of embodiments of the invention, including the first to third inks.

Pigments

The inks each contain a pigment. The pigment may be an inorganic pigment or an organic pigment.

Black Pigment

For a black ink, a black pigment is used. The black pigment is preferably carbon black (C. I. Pigment Black 7). Examples of the carbon black include furnace black, lamp black, acetylene black, and channel black.

Commercially available carbon blacks include No. 2300, No. 900, MCF88, No. 33, No. 40, No. 45, No. 52, MA7, MA8, MA100, and No. 2200B (each product name, produced by Mitsubishi Chemical Corporation); Raven H20, Raven 5750, Raven 5250, Raven 5000, Raven 3500, Raven 1255, and Raven 700 (each product name, produced by Carbon Columbia); Regal 400R, Regal 330R and Regal 660R, Mogul L, Monarch 700, Monarch 800, Monarch 880, Monarch 900, Monarch 1000, Monarch 1100, Monarch 1300, and Monarch 1400 (each product name, produced by CABOT JAPAN K. K.); Color Blacks FW1, FW2, FW2V, FW18, FW200, S150, S160 and S170, Printex 35, Printex U, Printex V, Printex 140U, and Special Blacks 6, 5, 4A and 4 (each product name, produced by Degussa); and BONJET BLACK M-800 (product name, produced by ORIENT CHEMICAL INDUSTRIES CO., LTD.).

Carbon blacks may be used singly or in combination.

The carbon black content is preferably 1% to 15% by mass relative to the total mass (100% by mass) of the ink. Such a content results in a high hiding power and a high color reproduction.

Preferably, the average particle size of the carbon black is in the range of 50 to 500 nm. A carbon black having an average particle size of 50 nm or more exhibits higher color developability and is therefore suitable for an ink. Also, a carbon black having an average particle size of 500 nm or less is suitable for using in an ink jet technique. More preferably, the average particle size of the carbon black is in the range of 50 to 300 nm. Such particles are superior in storage stability, ejection stability and sedimentation.

The average particle size mentioned herein refers to a sphere-equivalent 50% average particle size (d50) measured by a light scattering method, and can be obtained as below. Diffracted/scattered light generated by irradiating particles in a disperse medium with light is measured with detectors disposed in front, side and back of the disperse medium. With the assumption that particles, which are naturally indefinite in shape, are spherical, a cumulative curve is obtained from the measurement results with respect to the total volume (100%) of the spherical particles calculated from the volumes of measured particles, and the point where the cumulative value is 50% is defined as the sphere-equivalent 50% average particle size (d50).

Color Pigments Other than Black Pigment

The inks of the present embodiment may include color inks other than the black ink. Hence, the ink set may include the black ink and other color inks.

The color pigment used in a desired color ink is selected depending on the color of the ink. For example, pigments that can be used in a yellow ink include C. I. Pigment Yellows 1, 2, 3, 12, 14, 16, 17, 73, 74, 75, 83, 93, 95, 97, 98, 109, 110, 114, 128, 129, 138, 139, 147, 150, 151, 154, 155, 180, and 185. Preferably, at least one pigment selected from the group consisting of C. I. pigment yellows 74, 110, 128 and 129 is used for the yellow ink.

Pigments that can be used in a magenta ink include C. I. Pigment Reds 5, 7, 12, 48(Ca), 48(Mn), 57(Ca), 57:1, 112, 122, 123, 168, 184, 202 and 209, and C. I. Pigment Violet 19.

Preferably, at least one pigment selected from the group consisting of C. I. Pigment Reds 122, 202 and 209 and C. I. Pigment Violet 19 is used for the magenta ink. These pigments may be in the form of solid solution.

Pigments that can be used in a cyan ink include C. I. Pigment Blues 1, 2, 3, 15:2, 15:3, 15:4, 15:34, 16, 22 and 60, and C. I. Vat Blues 4 and 60. Preferably, at least either C. I. Pigment Blue 15:3 or C. I. Pigment Blue 15:4 is used. More preferably, C. I. Pigment Blue 15:3 is used.

Preferably, the average particle size of the color pigment is in the range of 50 to 500 nm. A color pigment having an average particle size of 50 nm or more exhibits higher color developability and is therefore suitable as an ink. Also, a color pigment having an average particle size of 500 nm or less is suitable for using in an ink jet technique. More preferably, the average particle size of the color pigment is in the range of 50 to 300 nm. Such particles are superior in storage stability, ejection stability and sedimentation.

Self-Dispersing Pigment

The first ink and the third ink each contain a self-dispersing pigment that can be dispersed by itself. The self-dispersing pigment can be dispersed or dissolved in an aqueous medium without a dispersant. The phrase "dispersed or dissolved in an aqueous medium without a dispersant" means that the pigment is stably present in the aqueous medium because of the hydrophilic group at the surfaces of the pigment particles even if a dispersant is not used for dispersing the pigment. Accordingly, the first and third inks are hardly foamed because there is no need to use a dispersant, which may degrade the defoaming property of inks. Consequently, these inks can be stably ejected. Also, a significant increase in viscosity resulting from the presence of the dispersant does not occur. Accordingly, the first and third inks can be easily handled, and, for example, a large amount of pigment can be added to increase the print density.

Examples of the above-mentioned hydrophilic group include —OM, —COOM, —CO—, —SO$_3$M, —SO$_2$M, —SO$_2$NH$_2$, —RSO$_2$M, —PO$_3$HM, —PO$_3$M$_2$, —SO$_2$NHCOR, —NH$_3$, and —NR$_3$ (where M represents hydrogen, an alkali metal, ammonium, a substituted or unsubstituted phenyl group, or an organic ammonium, and R represents an alkyl group having a carbon number of 1 to 12, or a substituted or unsubstituted naphthyl group). The self-dispersing pigment preferably has one or more of these hydrophilic groups.

The self-dispersing pigment can be prepared, for example, by physical treatment or chemical treatment for binding (grafting) those hydrophilic groups to the surfaces of the pigment particles. For the physical treatment, vacuum plasma treatment may be performed. For the chemical treatment, wet oxidation may be performed in which the surfaces of the pigment particles are oxidized with an oxidizing agent in water, or p-aminobenzoic acid may be bound to the surfaces of the pigment particles so as to bind the carboxy group to the surfaces with the phenyl group therebetween.

Resin-Dispersed Pigment

The second ink contains a resin-dispersed pigment that can be dispersed by a function of a resin. The resin (polymer) of the resin-dispersed pigment, used for dispersing the pigment is not particularly limited, but preferably has a glass transition temperature Tg of 55° C. or less, more preferably 50° C. or less. Polymers having a Tg of 55° C. or less can enhance the fixability of the pigment or ink. Preferably, the weight average molecular weight (in terms of styrene) measured by gel permeation chromatography (GPC) is in the range of 10,000 to 200,000. Polymers having such a molecular weight can enhance the storage stability of the ink. The term "weight average molecular weight" mentioned herein refers to a polystyrene equivalent weight average molecular weight measured by gel permeation chromatography (GPC) using L7100 System manufactured by Hitachi.

The resin or polymer may contain 70% by mass or more of a (meth)acrylate-(meth)acrylic acid copolymer. Such a polymer leads to an ink having superior fixability and glossiness. Preferably, at least either an alkyl (meta)acrylate having a carbon number of 1 to 24 or a cyclic alkyl (meta)acrylate having a carbon number of 3 to 24 accounts for 70% by mass or more of the total monomers forming the resin or polymer. Examples of such an alkyl (meta)acrylate or cyclic alkyl (meta)acrylate include methyl (meth)acrylate, ethyl (meth)acrylate, propyl (meth)acrylate, n-butyl (meth)acrylate, isobutyl (meth)acrylate, pentyl (meth)acrylate, hexyl (meth)acrylate, 2-ethylhexyl (meth)acrylate, octyl (meth)acrylate, nonyl (meth)acrylate, decyl (meth)acrylate, t-butylcyclohexyl (meth)acrylate, lauryl (meth)acrylate, isobornyl (meth)acrylate, cetyl (meth)acrylate, stearyl (meth)acrylate, isostearyl (meth)acrylate, tetramethylpiperidyl (meth)acrylate, dicyclopentanyl (meth)acrylate, dicyclopentenyl (meth)acrylate, dicyclopentenyloxy (meth)acrylate, and behenyl (meth)acrylate. In addition, other components may be added, such as hydroxyethyl (meth)acrylate, hydroxypropyl (meth)acrylate, diethylene glycol (meth)acrylate and other hydroxy (meth)acrylates having a hydroxy group, urethane (meth)acrylate, and epoxy (meth)acrylate.

Polymer-Coated Pigment

Among resin-dispersed pigments, preferred are pigments coated with a polymer (microencapsulated pigments). Such a pigment leads to an ink having still higher fixability, glossiness and color reproduction.

The polymer-coated pigment is prepared by phase inversion emulsification. More specifically, any of the above-described resins or polymers is dissolved in an organic solvent, such as methanol, ethanol, isopropanol, n-butanol, acetone, methyl ethyl ketone, or dibutyl ether. A pigment, and subsequently a neutralizer and water are added into the resulting solution. The mixture is stirred so that the materials are sufficiently dispersed, and thus an oil-in-water type dispersion is prepared. The organic solvent of the resulting dispersion is removed to yield a polymer-coated pigment in the form of dispersion in water. The stirring for dispersion can be performed using a ball mill, a roll mill, a bead mill, a high-pressure homogenizer, or a high-speed stirring disperser.

Preferred examples of the neutralizer include ethylamine, trimethylamine and other tertiary amines, lithium hydroxide, sodium hydroxide, potassium hydroxide, and ammonia, and it is preferable that the dispersion of the neutralizer in water have a pH of 6 to 10.

Preferably, the polymer coating the pigment has a weight average molecular weight (measured by GPC) of about 10,000 to 150,000, from the viewpoint of stably dispersing the pigment.

As described above, the second ink contains a resin-dispersed pigment, and is preferably a yellow ink. The yellow ink preferably contains water in a proportion of 10% to 60% by mass to the total mass (100% by mass) of the ink, and a water-soluble organic solvent and a surfactant.

By controlling the water content in the yellow ink in the above range, the amount of water that will be absorbed to the cellulose of coated paper is reduced. Accordingly, the swelling of the cellulose, which is considered to be a cause of cockling and curling, can be prevented. Thus, the yellow ink of the present embodiment is advantageous to ink-low absorbent recording media.

The source pigment of the polymer-coated pigment in the yellow ink can be selected from Pigment Yellows designated by color index numbers. An azo pigment or a pigment having a condensed ring may be used. Alternatively, an organic pigment, such as Yellow No. 4, 5, 205, or 401, may be used. Examples of the yellow pigment include C. I. Pigment Yellows 1, 3, 12, 13, 14, 17, 24, 34, 35, 37, 42, 53, 55, 74, 81, 83, 95, 97, 98, 100, 101, 104, 108, 109, 110, 117, 120, 128, 138, 150, 153, 155, 174, 180, and 198. Preferably, the yellow ink contains at least one organic pigment selected from the group consisting of C. I. Pigment Yellows 74, 109, 110, 128, 138, 147, 150, 155, 180, and 188.

The pigment content in each ink can be determined depending on the content of resin particles. When carbon black is used as the pigment, the pigment content is preferably 0.1% to 15% by mass, more preferably 1% to 12% by mass, relative to the total mass (100% by mass) of the ink from the viewpoint of increasing the reusability of recording media, such as paper.

Color pigments other than carbon black can be adjusted to an appropriate concentration, and the content of such a color pigment is not particularly limited. For example, a light ink containing 1% to 3% by mass of a pigment can form images having reduced granularity. A normal ink containing 4% to 12% by mass of a pigment can form images having a high color developability.

In particular, the polymer-coated pigment content in the yellow ink is preferably 6% by mass or more. Such a yellow ink can produce a recorded article having a high color developability.

Resin Particles

The first ink and the third ink of an embodiment of the invention may contain resin particles. Such an ink can exhibit higher fixability, glossiness and satisfactory reproduction. The resin particles function as an agent for enhancing glossiness. In other words, by adding resin particles to an ink, uneven gloss can be prevented effectively.

Examples of the resin particles include, but are not limited to, natural polymer compounds, such as glue, gelatin and saponin; and synthetic polymer compounds, such as polyvinyl alcohols, polypyrrolidones, (meth)acrylic polymers (polyacrylic acid, acrylic acid-acrylonitrile copolymer, vinyl acetate-acrylic acid copolymer, vinyl acetate-acrylic ester copolymer, etc.), styrene-(meth)acrylic polymers (styrene-acrylic acid copolymer, styrene-methacrylic acid copolymer, styrene-methacrylic acid-acrylic acid alkyl ester copolymer, styrene-α-methylstyrene-acrylic acid copolymer, styrene-α-methylstyrene-acrylic acid-acrylic acid alkyl ester copolymer, styrene-vinyl acetate-acrylic acid copolymer, etc.), styrene-maleic polymers, vinyl acetate-fatty acid vinyl-ethylene copolymers, and salts of these polymers.

Preferably, at least one of (meth)acrylic polymers and styrene (meth)acrylic polymers is used. These polymers lead to an ink having still higher fixability and glossiness. Among (meth)acrylic polymers, preferred are polymers synthesized from monomers of which at least either an alkyl (meta)acrylate having a carbon numbers of 1 to 24 or a cyclic alkyl (meta)acrylate having a carbon number of 3 to 24 accounts for 70% by mass or more.

Examples of such an alkyl (meta)acrylate or cyclic alkyl (meta)acrylate include methyl (meth)acrylate, ethyl (meth)acrylate, propyl (meth)acrylate, n-butyl (meth)acrylate, isobutyl (meth)acrylate, pentyl (meth)acrylate, hexyl (meth)acrylate, 2-ethylhexyl (meth)acrylate, octyl (meth)acrylate, nonyl (meth)acrylate, decyl (meth)acrylate, t-butylcyclohexyl (meth)acrylate, lauryl (meth)acrylate, isobornyl (meth)acrylate, cetyl (meth)acrylate, stearyl (meth)acrylate, isostearyl (meth)acrylate, tetramethylpiperidyl (meth)acrylate, dicyclopentanyl (meth)acrylate, dicyclopentenyl (meth)acrylate, dicyclopentenyloxy (meth)acrylate, and behenyl (meth)acrylate. In addition, other monomers may be used. Examples of other monomers include, but are not limited to, hydroxy (meth)acrylates having a hydroxy group, such as hydroxyethyl (meth)acrylate, hydroxypropyl (meth)acrylate and diethylene glycol (meth)acrylate, urethane (meth)acrylate, and epoxy (meth)acrylate.

The average particle size of the resin particles, in the form of dispersion in water, is preferable 20 to 500 nm, and more preferably 50 to 300 nm. Resin particles having an average particle size of 20 nm or more help produce a recorded article having a high color developability. Also, when the resin particles have an average particle size of 500 nm or less, the ink can exhibit high ejection stability and storage stability.

The weight average molecular weight of the resin particles is preferably 5,000 to 200,000, and more preferably 10,000 to 30,000. Resin particles having a weight average molecular weight in such a range helps the pigment disperse stably, and enhances the ejection stability and storage stability of the ink.

Preferably, the resin particles are in the form of an emulsion. The resin particles in an emulsion fuse with each other and with color components and thus allow the pigment to adhere to the recording medium while the ink is drying. Consequently, the fixability of the image in the recorded article is further enhanced.

Preferably, the resin of the resin particles is at least one selected from the group consisting of acrylic resin, methacrylic resin, styrene resin, urethane resin, acrylamide resin, and epoxy resin. These resins may be homopolymers or copolymers.

The resin particles may be made of a single resin or a combination of resins.

Resin particles can further enhance the fixability and glossiness of the ink or the pigment. The resin particle content is preferably 0.1% to 7% by mass, more preferably 1% to 5% by mass, relative to the total mass (100% by mass) of the ink.

Fatty Acid

The first ink contains a fatty acid, but the second ink and the third ink do substantially not contain a fatty acid. The phrase "substantially not contain a fatty acid" or "contain(s) substantially no fatty acid" suggests that a fatty acid may be present to the extent of not departing from the spirit of the invention.

The molecules of the fatty acid will be arranged like a surfactant over the surfaces (gas-liquid interfaces) of ink droplets that have landed (have been deposited) on a recording medium, and thus form a film that can suppress bleeding. Accordingly, the fatty acid has a hydrophobic long-chain hydrocarbon group. When the hydrocarbon group has a carbon number of 8 or more, bleeding can be suppressed effectively.

The fatty acid in the first ink may be in the form of a metal salt or an organic alkali salt. Such a fatty acid salt can produce the same effect as the fatty acid. When the water in the first ink deposited on a recording medium evaporates, the fatty acid in the ink precipitates on the surface of the recording medium and forms a film of a surfactant. This film suppresses bleeding. In particular, the effect of anti-bleeding is significant between an ink containing a fatty acid and an ink not containing a fatty acid.

Examples of the fatty acid include, but are not limited to, oleic acid, linoleic acid, linolenic acid, stearic acid, and octylic acid.

Many unsaturated fatty acids have two or more double bonds. However, such unsaturated fatty acids are likely to be oxidized because the methylene hydrogen between two double bonds is easily abstracted. However, mono-unsaturated fatty acids having a single double bond, such as oleic acid, do not have methylene hydrogens, and are accordingly highly stable to oxidation. Also, saturated fatty acids not having a double bond are more stable to oxidation.

In view of the melting point of fatty acid, when a liquid fatty acid is used, the probability of clogging nozzles is reduced even if the fatty acid precipitates on the surface of the nozzles. A typical fatty acid that is liquid at room temperature and has one or no double bond is oleic acid. Many of the saturated fatty acids stable to oxidation are solid at room temperature and are unsuitable for being added to ink. Accordingly, oleic acid is preferably used as the fatty acid of the first ink.

A fatty acid may be used singly, or two or more fatty acids may be used in combination.

The fatty acid content is preferably 0.01% to 2% by mass, more preferably 0.05% to 1% by mass, relative to the total mass (100% by mass) of the ink so that higher anti-bleeding effect can be produced.

Surfactant

The inks of the ink set of the present embodiment may contain a surfactant. The surfactant may be anionic, cationic, amphoteric, or nonionic. Preferably, a nonionic surfactant is used. Inks containing a nonionic surfactant do not foam easily.

Nonionic surfactants include acetylene glycol surfactants; acetylene alcohol surfactants; ethers, such as polyoxyethylene nonylphenyl ether, polyoxyethylene octylphenyl ether, polyoxyethylene dodecylphenyl ether, polyoxyethylene alkylallyl ether, polyoxyethylene oleyl ether, polyoxyethylene lauryl ether, polyoxyethylene alkyl ether, and polyoxyalkylene alkyl ether; polyoxyethylene oleic acid; esters, such as polyoxyethylene oleic acid ester, polyoxyethylene distearic acid ester, sorbitan laurate, sorbitan monostearate, sorbitan monooleate, sorbitan sesquioleate, polyoxyethylene monooleate, and polyoxyethylene stearate; polyether-modified siloxane-based surfactants, such as dimethylpolysiloxane; and fluorine-containing surfactants, such as fluoroalkyl esters and perfluoroalkylcarboxylates. These nonionic surfactants may be used singly or in combination.

Among those, preferred is at least either an acetylene glycol-based surfactant or a polyether-modified siloxane surfactant.

Examples of the acetylene glycol surfactant include 2,4,7,9-tetramethyl-5-decyne-4,7-diol, 3,6-dimethyl-4-octyne-3,6-diol, and 3,5-dimethyl-1-hexyne-3-ol. Commercially available acetylene glycol surfactants may be used, such as Surfynols 104, 82, 465, 485 and TG (each product name, produced by Air Products and Chemicals, Inc.), and Olfine STG and Olfine E1010 (each product name, produced by Nissin Chemical Industry Co., Ltd.) Examples of the polyether-modified siloxane-based surfactant include BYK-345, BYK-346, BYK-347, BYK-348 and UV3530 (each product name, produced by BYK).

A surfactant may be used singly, or two or more surfactants may be used in combination.

The surfactant content is preferably 0.1% to 3.0% by mass relative to the total mass (100% by mass) of the ink so that dots can easily spread over the surface of the recording medium.

Water-Soluble Organic Solvent

The inks of the ink set of the present embodiment may contain a water-soluble organic solvent.

Examples of the water-soluble organic solvent include: polyhydric alcohols, such as glycerol, 1,2,6-hexanetriol, trimethylolpropane, ethylene glycol, propylene glycol, diethylene glycol, triethylene glycol, tetraethylene glycol, pentaethylene glycol, dipropylene glycol, 2-butene-1,4-diol, 2-ethyl-1,3-hexanediol, 2-methyl-2,4-pentanediol, 1,2-octanediol, 1,2-hexanediol, 1,2-pentanediol, and 4-methyl-1,2-pentanediol; saccharides, such as glucose, mannose, fructose, ribose, xylose, arabinose, galactose, aldonic acid, glucitol, (sorbitol), maltose, cellobiose, lactose, sucrose, trehalose, and maltotriose; sugar alcohols; hyaluronic acids; solid wetting agents, such as urea; alkyl alcohols having a carbon number of 1 to 4, such as ethanol, methanol, butanol, propanol, and isopropanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, dipropylene glycol monomethyl ether, dipropylene glycol monoethyl ether, dipropylene glycol mono-n-propyl ether, and dipropylene glycol mono-iso-propyl ether; and 2-pyrrolidone, N-methyl-2-pyrrolidone, 1,3-dimethyl-2-imidazolidinone, formamide, acetamide, dimethyl sulfoxide, sorbitol, sorbitan, acetin, diacetin, triacetin, and sulfolane. These solvents may be used singly or in combination. The ink containing a water-soluble organic solvent can be stably stored and be stably discharged even if the solid content in the ink is high.

Preferably, the water-soluble organic solvent contains both a polyhydric alcohol monoalkyl ether and a polyhydric alcohol. These water-soluble organic solvents can reduce the occurrence of bleeding and non-uniformity to enhance the printing quality.

The polyhydric alcohol monoalkyl ether can be selected from the above cited glycol ethers, and examples of such a polyhydric alcohol monoalkyl ether include diethylene glycol monoethyl ether, diethylene glycol monobutyl ether, diethylene glycol monoisobutyl ether, dipropylene glycol monomethyl ether, dipropylene glycol monoisopropyl ether, dipropylene glycol monoisopropyl ether, dipropylene glycol monobutyl ether, triethylene glycol monomethyl ether, triethylene glycol monobutyl ether (TEGmBE), tripropylene glycol monomethyl ether, and tripropylene glycol monobutyl ether.

Although any of the above-cited polyhydric alcohols can be used in the ink, 1,2-alkanediols are preferred, such as 1,2-pentanediol, 1,2-hexanediol, and 1,2-octanediol.

Water-soluble organic solvents may be used singly or in combination.

Preferably, the water-soluble organic solvent content is 1% to 40% by mass relative to the total mass (100% by mass) of the ink, from the viewpoint of ensuring appropriate properties of the ink, including viscosity, and ensuring quality and reliability in printing.

Water

The inks of the ink set of the present embodiment may contain water. The water may be pure water or ultrapure water, including, but not limited to, ion exchanged water, ultrafiltered water, reverse osmotic water, or distilled water. The water content is not particularly limited.

pH Adjuster

The inks of the ink set of the present embodiment may contain a pH adjuster. Examples of the pH adjuster include alkali metal hydroxides, such as lithium hydroxide, potassium hydroxide, and sodium hydroxide; ammonia; and alkanolamines, such as triethanolamine, tripropanolamine, diethanolamine, and monoethanolamine. Preferably, the ink is adjusted to a pH of 6 to 10 by adding at least one pH adjuster selected from the group consisting of alkali metal hydroxides, ammonia, triethanolamine, and tripropanolamine. If the pH of the ink is outside this range, the materials of the ink jet printer are likely to be adversely affected, and the printer becomes difficult to recover from clogging. The pH adjuster content is not particularly limited.

Preservative/Antifungal Agent

The inks of the ink set of the present embodiment may contain a preservative or an antifungal agent. Preservatives and antifungal agents include ethylenediaminetetraacetic acid (EDTA), sodium benzoate, sodium pentachlorophenol, sodium-2-pyridinethiol-1-oxide, sodium sorbate, sodium dehydroacetate, and 1,2-dibenzisothiazolin-3-one (Proxel CRL, Proxel BDN, Proxel GXL, Proxel XL-2, and Proxel TN, each produced by Avecia). The preservative/antifungal agent content is not particularly limited.

Other Additives

The inks of the ink set of the present embodiment may further contain other additives. Other additives include, but are not limited to, a rust preventive, an antioxidant, a thickener, and a surface tension adjuster.

The ink set of the present embodiment exhibits high anti-bleeding effect when it is used for printing on a recording medium, particularly a low-absorbent recording medium.

Recording Method

An embodiment of the invention provides a recording method. In the recording method, recording is performed using the above-described ink set.

More specifically, in the recording method, ink droplets are discharged onto a heated recording medium to form an image. For example, each ink stored in a nozzle head may be intermittently ejected by converting electrical signals to mechanical signals with electrostrictive elements, thereby forming characters or symbols on the surface of a recording medium. The ink stored in the nozzle head may be intermittently discharged by expanding bubbles in the ink produced by heating the ink from a position very close to the discharge port, thereby forming characters or symbols on the surface of a recording medium. The ink set of the above embodiment is suitable for an ink jet recording method using an electrostrictive element. Preferably, ink droplets are discharged from a recording head by the dynamic action of a piezoelectric element.

Recording Medium

The ink set of the above embodiment is effective in printing on a low-absorbent recording medium. The low-absorbent recording medium may be coated paper, such as slightly coated paper, art paper, coat paper, matte paper, and cast-coated paper and other book-printing paper. Low-absorbent recording media also include plain paper not having an ink-receiving layer, ink jet brochure paper having a thin ink jet recording layer, and ink jet coat paper.

Coated paper is a type of paper whose surface is coated with a coating material to enhance the beauty and smoothness. The coating material can be prepared by mixing a pigment, such as talc, pyrophyllite, clay (kaolin), titanium oxide, magnesium carbonate, or calcium carbonate, and an adhesive, such as starch or polyvinyl alcohol. The coating material is applied to a paper with a coater in a manufacturing process of the paper. The coater may be of on-machine type that is directly connected to a paper machine so that paper making and coating are performed in one operation, or off-machine type in which coating is performed independently of paper making. Coated paper is mainly used for recording and is classified into printing coated paper by Classification of dynamic statistics of production, the Ministry of Economy, Trade and Industry of Japan.

The slightly coated paper refers to a recording paper coated with 12 g/m² or less of coating material. The art paper refers to a high-grade recording paper (fine quality paper or paper containing 100% of chemical pulp) coated with about 40 g/m² of coating material. The coat paper refers to a recording paper coated with about 20 to 40 g/m² of coating material (for preferred coat paper, see the section of Examples described later). The cast-coated paper refers to a recording paper prepared by pressing the surface of art paper or coat paper with a machine called cast drum to increase the gloss and recording effect.

The low-absorbent recording medium can be synthetic paper or book printing paper (for example, OKT+ manufactured by Oji Paper), and the ink set of the above embodiment can provide anti-bleeding, high-quality images even if printing is performed at a low resolution on art paper, high-resolution paper used for POD (print on demand), or laser printer paper. The high-resolution paper for POD may be Ricoh business coat gloss 100 (manufactured by Ricoh). The laser printer paper may be LPCCTA4 (manufactured by Seiko Epson Corporation). Waterproof paper may be used, such as Color Laser Card (manufactured by Mitsubishi Kagaku Media) and Laser Peach (manufactured by Nisshinbo Postal Chemical). Low-absorbent recording media include paper sheets that are not especially intended for ink jet recording, such as plain paper or PPC (plain paper copy) sheets. Brochure paper or the like having a thin ink jet recording layer is also a type of low-absorbent recording media. Commercially available products of such brochure paper include HP Brochure paper manufactured by Hewlett-Packard, Ink Jet Brochure paper manufactured by STAPLES, and coat paper KA4250BC for business ink jet printers manufactured by Seiko Epson.

In general, ink jet paper is absorbent and refers to a recording medium intended for ink jet recording and including a base sheet, such as high-quality paper, and an ink-receiving layer on the base sheet. Ink jet paper may be of a "swelling type" whose ink-receiving layer contains a water-soluble resin, such as polyvinyl alcohol, or of a "absorbing type" whose ink-receiving layer contains porous materials, such as amorphous silica. Ink jet photo paper is particularly liable to accentuate bleeding. It is therefore desirable that anti-bleeding effect be exhibited on such ink jet photo paper as with low-absorbent recording media. Since the ink set of the above embodiment exhibits high anti-bleeding effect on low-absorbent recording media, the ink set can exhibit satisfactory anti-bleeding effect on absorbent ink jet paper and can produce glossy recorded articles.

EXAMPLES

The embodiments of the invention will be further described in detail with reference to Examples, but the invention is not limited to the Examples.

Raw Materials

Preparation of Self-Dispersing Black Pigment Dispersion

To 500 g of water was added 20 g of a commercially available carbon black, Color Black S170 (product name, produced by Degussa), and the carbon black was dispersed in the water for 5 minutes with a home mixer. The resulting liquid was placed in a 3 L glass vessel equipped with a stirrer, and a gas containing 8% by mass of ozone was introduced to the vessel at a flow rate of 500 mL/min with stirring. In this operation, the ozone was generated with an electrogeneration-type ozone generator or ozonizer manufactured by Permelec Electrode Ltd. The resulting stock dispersion was filtered through a glass fiber filter GA-100 (product name, manufactured by ADVANTEC MFS, INC.), and the filtrate was concentrated to a solid content of 20% by mass while 0.1 N potassium hydroxide solution was being added to adjust the pH to 9. Thus a self-dispersing black pigment dispersion was prepared.

Preparation of Resin-Dispersed Black Pigment Dispersion

A dispersion of a black pigment whose particles are coated with a water-insoluble polymer was prepared as below.

Synthesis of Water-Insoluble Polymer

A reaction vessel sufficiently purged with nitrogen gas was charged with 20 parts by mass of organic solvent (methyl ethyl ketone), 0.03 parts by mass of polymerization chain transfer agent (2-mercaptoethanol), a polymerization initiator, and monomers shown in Table 1, and polymerization was performed at 75° C. with stirring. Relative to 100 parts by mass of the monomers, 0.9 parts by mass of 2,2'-azobis(2,4-dimethylvaleronitrile) dissolved in 40 parts by mass of methyl ethyl ketone was added. The mixture was aged at 80° C. for one hour to yield a polymer solution. The values shown in Table 1 each represent a proportion (mass %) of the corresponding monomer to the total amount (100% by mass) of the monomer mixture.

TABLE 1

| Monomer mixture composition | Water-insoluble polymer (mass %) |
|---|---|
| Polypropylene glycol monomethacrylate (PO = 9) | 15 |
| Poly(ethylene glycol-propylene glycol) monomethacrylate (EO = 5, PO = 7) | 15 |
| Methacrylic acid | 12 |
| Styrene monomer | 40 |
| Styrene macromere | 15 |
| Benzylmethacrylate | 10 |

EO: Ethylene oxide
PO: Propylene oxide

Preparation of Black Pigment Dispersion

In 45 parts by mass of methyl ethyl ketone was dissolved 7.5 parts by mass of the water-insoluble polymer prepared from the monomer mixture shown in Table 1, and then a predetermined amount of 20% aqueous solution of sodium hydroxide (neutralizer) was added to the solution of the water-insoluble polymer to neutralize the group that would form a salt. Furthermore, 20 parts by mass of a black pigment was added, and the mixture was blended in a bead mill for 2 hours. To the resulting mixture was added 120 parts by mass of ion exchanged water. After stirring the mixture, the methyl ethyl ketone was removed at 60° C. under reduced pressure, and part of the water was further removed to yield a dispersion of a resin-dispersed black pigment. The solid content of the dispersion was 20% by mass.

Preparation of Self-Dispersing Cyan Pigment Dispersion

A 4 L stainless steel beaker was equipped with a rotor-stator type high shear mixer L4RT-A (manufactured by SILVERSON) and was immersed in an ice bath. The beaker was charged with about 75 g of C. I. Pigment Blue 15:4 and 1,000 g of water, and the materials were mixed to be homogenized at 7,200 rpm for 15 minutes. To the mixture was added 20 mL of a solution of 2.07 g (0.01 mol) of o-acetaniside in isopropanol, followed by stirring for 15 minutes. In another vessel, a diazonium salt was produced by mixing 4.35 g (0.025 mol) of sulfanilic acid, 30 mL of 1 N HCl, and 1.73 g (0.025 mol) of sodium nitrite at a temperature of 5 to 10° C. The diazonium salt was added to the mixture of C. I. Pigment Blue 15:4 and o-acetaniside with stirring. The temperature was maintained at about 10° C. The resulting mixture was adjusted to a pH of 5 to 6 by dropping 5 M sodium hydroxide solution, and was stirred for another 2 hours while the progress of the reaction was being checked by observing the presence or absence of the diazonium salt. In the observation of the presence or absence of the diazonium salt, droplets of the reaction mixture and 1 M $Na_2CO_3$ solution containing 0.1% of aminosalicylic acid have been dropped one each on a filter paper so that the two droplets would spread to come into contact with each other. If the diazonium salt is present, the contact portion turns orange. The mixture was placed in a Telsonic flow-type ultrasonic apparatus and subjected to ultrasonic treatment for 2 hours. The resulting pigment dispersion was purified through a 50 nm diafiltration membrane column, and was then concentrated to a solid content of 20% by mass to yield a self-dispersing cyan pigment dispersion.

Preparation of Resin-Dispersed Cyan Pigment Dispersion

A resin-dispersed cyan pigment dispersion containing 20% by mass of solid content was prepared in the same manner as in the preparation of the resin-dispersed black pigment dispersion, except that C. I. Pigment Blue 15:4 was used as the pigment instead of carbon black.

Preparation of Self-Dispersing Magenta Pigment Dispersion

A self-dispersing magenta pigment dispersion containing 20% by mass of solid content was prepared in the same manner as in the preparation of the self-dispersing cyan pigment dispersion, except that C. I. Pigment Red 122 was used as the pigment instead of C. I. Pigment Blue 15:4.

Preparation of Resin-Dispersed Magenta Pigment Dispersion

A resin-dispersed magenta pigment dispersion containing 20% by mass of solid content was prepared in the same manner as in the preparation of the resin-dispersed black pigment dispersion, except that C. I. Pigment Red 122 was used as the pigment instead of carbon black.

Preparation of Self-Dispersing Yellow Pigment Dispersion

A self-dispersing yellow pigment dispersion containing 20% by mass of solid content was prepared in the same manner as in the preparation of the self-dispersing cyan pigment dispersion, except that C. I. Pigment Yellow 74 was used as the pigment instead of C. I. Pigment Blue 15:4.

Preparation of Resin-Dispersed Yellow Pigment Dispersion

A resin-dispersed yellow pigment dispersion containing 20% by mass of solid content was prepared in the same manner as in the preparation of the resin-dispersed black pigment dispersion, except that C. I. Pigment Yellow 74 was used as the pigment instead of carbon black.

Preparation of Resin Emulsion

A reaction vessel equipped with a stirrer, a reflux condenser, a dropping funnel, and a thermometer was charged with 900 g of ion exchanged water and 1 g of sodium lauryl sulfate. The reaction vessel was heated to 70° C. while being purged with nitrogen with stirring. With the temperature in the vessel maintained at 70° C., 4 g of potassium persulfate was added as a polymerization initiator and dissolved. Then, an emulsion prepared by adding, with stirring, 20 g of acrylamide, 365 g of styrene, 545 g of butyl acrylate and 30 g of methacrylic acid to the mixture of 450 g of ion exchanged water and 3 g of sodium lauryl sulfate was continuously dropped into the reaction solution over a period of 4 hours. After dropping the emulsion, the reaction liquid was aged for 3 hours. The resulting resin emulsion was cooled to room temperature, and ion exchanged water and a sodium hydroxide aqueous solution were added to the resin emulsion to adjust it to a solid content of 40% by mass and to a pH of 8.

The glass transition temperature of the resin particles in the resin emulsion was −6° C.

Other ingredients were as follows:

Surfactant
  Olfine E1010 (product name, produced by Nissin Chemical Industry)
  Surfynol 104 (product name, produced by Air Products)
Fatty Acid
  Oleic acid
  Linoleic acid
  Stearic acid
  Octylic acid
pH Adjuster
  Tripropanolamine
  Potassium hydroxide
  Sodium hydroxide
Penetration Enhancer
  1,2-Hexandiol
  Triethylene glycol monobutyl ether (hereinafter referred to as TEGmBE in some cases)
  Glycerol
  Trimethylolpropane
Preservatives/Antifungal Agent
  EDTA
  Proxel XL-2 (product name, produced by Avecia)
Water
  Ion exchanged water Preparation of Inks Black inks K1 to K5, cyan inks C1 to C4, magenta inks M1 to M4, and yellow inks Y1 to Y4 were prepared by mixing ingredients according to the compositions shown in Tables 2 and 3, and filtering the mixture through a 10 μm membrane filter. The numeral values in Tables 2 and 3 each represent the content (percent by mass) of the corresponding ingredient in the ink. The solid content in each pigment dispersion was 20% by mass, and the solid content in the resin emulsion was 40% by mass.

TABLE 2

| Ink name | | K1 | K2 | K3 | K4 | K5 | C1 | C2 | C3 | C4 |
|---|---|---|---|---|---|---|---|---|---|---|
| Ink type | | 1 | 1 | 2 | 3 | 3 | 1 | 1 | 2 | 3 |
| Black pigment dispersion | Self-dispersing | 50 | 50 | — | 50 | 50 | — | — | — | — |
| | Resin-dispersed | — | — | 50 | — | — | — | — | — | — |
| Cyan pigment dispersion | Self-dispersing | — | — | — | — | — | 30 | 30 | — | 30 |
| | Resin-dispersed | — | — | — | — | — | — | — | 30 | — |
| | Resin emulsion | — | 8 | — | — | 8 | — | 8 | — | 8 |
| Surfactant | Olfine E1010 | 0.5 | 0.5 | 0.5 | 0.5 | 0.5 | 0.5 | 0.5 | 0.5 | 0.5 |
| | Surfynol 104 | 0.2 | 0.2 | 0.5 | 0.5 | 0.5 | 0.5 | 0.5 | 0.5 | 0.5 |
| Fatty acid | Oleic acid | 0.2 | — | — | — | — | 0.2 | 0.2 | — | — |
| | Linoleic acid | — | 0.2 | — | — | — | — | — | — | — |
| | Stearic acid | — | — | — | — | — | — | — | — | — |
| | Octylic acid | — | — | — | — | — | — | — | — | — |
| pH Adjuster | Tripropanolamine | 0.2 | 0.2 | 0.2 | 0.2 | 0.2 | 0.2 | 0.2 | 0.2 | 0.2 |
| | Potassium hydroxide | 0.05 | 0.05 | — | 0.05 | — | 0.05 | — | — | — |
| | Sodium hydroxide | — | — | 0.05 | — | 0.05 | — | — | — | — |
| Water-soluble organic solvent | 1,2-Hexandiol | 2 | 2 | 2 | 2 | 2 | 2 | 2 | 2 | 2 |
| | TEGmBE | 1 | 1 | 1 | 1 | 1 | 1 | 1 | 1 | 1 |
| | Glycerol | 8 | 8 | 8 | 8 | 8 | 8 | 8 | 8 | 8 |
| | Trimethylolpropane | 3 | 3 | 3 | 3 | 3 | 3 | 3 | 3 | 3 |
| Preservatives/Antifungal agent | EDTA | 0.01 | 0.01 | 0.01 | 0.01 | 0.01 | 0.01 | 0.01 | — | — |
| | Proxel XL-2 | 0.01 | 0.01 | 0.01 | 0.01 | 0.01 | 0.01 | 0.01 | — | — |
| Water | Ion exchanged water | Balance | Balance | Balance | Balance | Balance | Balance | Balance | Balance | Balance |
| Total | | 100 | 100 | 100 | 100 | 100 | 100 | 100 | 100 | 100 |

TABLE 3

| Ink name | | M1 | M2 | M3 | M4 | Y1 | Y2 | Y3 | Y4 |
|---|---|---|---|---|---|---|---|---|---|
| Ink type | | 1 | 2 | 3 | 3 | 1 | 2 | 3 | 3 |
| Magenta pigment dispersion | Self-dispersing | 40 | — | 40 | 40 | — | — | — | — |
| | Resin-dispersed | — | 40 | — | — | — | — | — | — |
| Yellow pigment dispersion | Self-dispersing | — | — | — | — | 30 | — | 30 | 30 |
| | Resin-dispersed | — | — | — | — | — | 30 | — | — |
| | Resin emulsion | — | — | — | 8 | — | — | — | 8 |
| Surfactant | Olfine E1010 | 0.5 | 0.5 | 0.5 | 0.5 | 0.5 | 0.5 | 0.5 | 0.5 |
| | Surfynol 104 | 0.5 | 0.5 | 0.5 | 0.5 | 0.5 | 0.5 | 0.5 | 0.5 |
| Fatty acid | Oleic acid | 0.2 | — | — | — | 0.2 | — | — | — |
| pH Adjuster | Tripropanolamine | 0.2 | 0.2 | 0.2 | 0.2 | 0.2 | 0.2 | 0.2 | 0.2 |
| Water-soluble organic solvent | 1,2-Hexandiol | 2 | 2 | 2 | 2 | 2 | 2 | 2 | 2 |
| | TEGmBE | 1 | 1 | 1 | 1 | 1 | 1 | 1 | 1 |
| | Glycerol | 8 | 8 | 8 | 8 | 8 | 8 | 8 | 8 |
| | Trimethylolpropane | 3 | 3 | 3 | 3 | 3 | 3 | 3 | 3 |

TABLE 3-continued

| Ink name | | M1 | M2 | M3 | M4 | Y1 | Y2 | Y3 | Y4 |
|---|---|---|---|---|---|---|---|---|---|
| Preservatives/ | EDTA | 0 | 0 | 0 | 0 | 0 | 0 | 0 | 0 |
| Antifungal agent | Proxel XL-2 | 0 | 0 | 0 | 0 | 0 | 0 | 0 | 0 |
| Water | Ion exchanged water | Balance | Balance | Balance | Balance | Balance | Balance | Balance | Balance |
| | Total | 100 | 100 | 100 | 100 | 100 | 100 | 100 | 100 |

Preparation of Ink Sets

Examples 1 to 8 and Comparative Examples 1 to 4

Ink sets were prepared according to the combinations shown in Tables 4 to 6.
Evaluations
Anti-Bleeding Effect
An ink jet printer PX-A550 (manufactured by Seiko Epson) that had been remodeled to change the recording process was filled with the inks of the prepared ink set. The following patterns were printed on the following recording media and evaluated according to the following criteria.

Examples 1 to 3, Comparative Examples 1 to 4

Examples 1 to 3 and Comparative Examples 1 to 4 were evaluated for the anti-bleeding effect when a character was printed using the ink set under the conditions below:
Plain paper: Double-sided high-quality recycled plain paper (Product code: KA4250NPDR, manufactured by Seiko Epson)
Coat paper: Business Ink jet Coat Paper (Product code: KA4250BC, manufactured by Seiko Epson)
Printing pattern: A 6-point kanji character that means "write" in English was printed with a black ink on a yellow background.
Evaluation criteria were as follows:
Excellent: No bleeding was observed even through a magnifying lens;
Good: Although bleeding was observed through a magnifying lens, it was not visually recognized; and
Bad: Bleeding was visually observed.

Examples 4 to 6

Examples 4 to 6 were evaluated for anti-bleeding effect when a text was printed with the ink set under the conditions below:
Plain paper and coat paper were the same as in Examples 1 to 3.
Printing pattern: Characters were printed so that black lines of 4.5 points in thickness intersect cyan, magenta and yellow lines of 4.5 points in thickness. The degree of bleeding at the intersections of the black line with the cyan, magenta and yellow liens was observed.
Evaluation criteria were as follows:
Excellent: No bleeding was observed even through a magnifying lens;
Good: Although bleeding was observed through a magnifying lens, it was not visually recognized; and
Bad: Bleeding was visually observed.

Examples 7 and 8

Examples 7 and 8 were evaluated for anti-bleeding effect and uneven gloss when a photographic image or the like was printed using the ink set under the conditions below:
Plain paper was the same as in Examples 1 to 3.
Photo paper: Glossy photo paper (product code KA4100PSKR, manufactured by Seiko Epson)
Printing pattern: A photographic image was printed so that cyan, magenta and yellow lines of 4.5 points in thickness intersect each other. The degree of bleeding at the intersections of the cyan, magenta and yellow lines was observed.
Evaluation criteria were as follows:
Excellent: No bleeding was observed even through a magnifying lens;
Good: Although bleeding was observed through a magnifying lens, it was not visually recognized; and
Bad: Bleeding was visually observed.
Uneven Gloss
The glossinesses of the images printed using the ink sets of Examples 7 and 8 were measured in accordance with JIS Z 8741: 1997. The evaluation criteria for uneven gloss were as bellows:
Excellent: The differences in glossiness at a measurement angle of 60° among yellow, magenta and cyan were less than 20;
Good: The differences in glossiness at a measurement angle of 60° among yellow, magenta and cyan were 20 or more and less than 40; and
Bad: The differences in glossiness at a measurement angle of 60° among yellow, magenta and cyan were 40 or more.

TABLE 4

| | | Example 1 | Example 2 | Example 3 | Comparative Example 1 | Comparative Example 2 | Comparative Example 3 | Comparative Example 4 |
|---|---|---|---|---|---|---|---|---|
| | Black ink | K1 | K2 | K2 | K1 | K3 | K4 | K5 |
| | Yellow ink | Y3 | Y4 | Y2 | Y1 | Y2 | Y3 | Y2 |
| Bleeding | Plain paper | Excellent | Excellent | Excellent | Good | Good | Good | Good |
| | Coat paper | Good | Good | Good | Bad | Bad | Bad | Bad |

TABLE 5

|  |  | Example 4 | Example 5 | Example 6 |
|---|---|---|---|---|
| Black ink |  | K2 | K2 | K2 |
| Cyan ink |  | C3 | C4 | C4 |
| Magenta ink |  | M2 | M4 | M4 |
| Yellow ink |  | Y2 | Y4 | Y2 |
| Bleeding | Plain paper | Excellent | Excellent | Excellent |
|  | Coat paper | Good | Good | Good |

TABLE 6

|  |  | Example 7 | Example 8 |
|---|---|---|---|
| Cyan ink |  | C1 | C2 |
| Magenta ink |  | M3 | M4 |
| Yellow ink |  | Y2 | Y2 |
| Uneven gloss |  | Good | Excellent |
| Bleeding | Plain paper | Excellent | Excellent |
|  | Photo paper | Good | Good |

The above results show that the black inks used in the combinations of the ink sets of Examples 1 to 3, which are within the scope of the invention, exhibited superior antibleeding effect to those of the ink sets of Comparative Examples 1 to 4, which are outside the scope of the invention, when the ink sets were used for recording on a recording medium, particularly on a low-absorbent recording medium such as coat paper. Also, it has been found that the ink sets of Examples 4 to 8 can prevent color bleeding (and uneven gloss, when used for recording images), and can therefore be advantageously used for recording characters or letters and images.

The reason why a self-dispersing pigment and a fatty acid are used in the black ink is to suppress the occurrence of satellite droplets, and to achieve high color developability and high ejection stability. In an ink containing a resin-dispersed pigment such as microencapsulated pigment, the pigment content cannot be increased. Also, since an ink containing a pigment at a high concentration is inferior in ejection stability, a fatty acid, such as oleic acid, was used.

What is claimed is:

1. An ink set comprising:
    a first ink containing a fatty acid in an amount that ranges between 0.01% to 2% by mass and a self-dispersing pigment; and
    at least one of a second ink containing a resin-dispersed pigment and a fatty acid in an amount that is insufficient to prevent bleeding, and a third ink containing a self-dispersing pigment and a fatty acid in an amount that is insufficient to prevent bleeding,
    wherein the fatty acid is selected from the group consisting of oleic acid, linoleic acid, linolenic acid, stearic acid, and octylic acid.

2. The ink set according to claim 1, wherein the ink set includes the first ink, the second ink and the third ink.

3. The ink set according to claim 1, wherein the first ink is a black ink.

4. The ink set according to claim 1, wherein the second ink is a yellow ink.

5. The ink set according to claim 1, wherein the third ink is at least one of a cyan ink and a magenta ink.

6. The ink set according to claim 1, wherein the first ink includes a black ink, the second ink includes a yellow ink, and the third ink includes a cyan ink and a magenta ink.

7. The ink set according to claim 1, wherein the first ink and the third ink contain resin particles.

8. A recording method comprising recording with the ink set as set forth in claim 1.

9. A recording method comprising recording with the ink set as set forth in claim 2.

10. A recording method comprising recording with the ink set as set forth in claim 3.

11. A recording method comprising recording with the ink set as set forth in claim 4.

12. A recording method comprising recording with the ink set as set forth in claim 5.

13. A recording method comprising recording with the ink set as set forth in claim 6.

14. A recording method comprising recording with the ink set as set forth in claim 7.

* * * * *